(12) United States Patent
Granot et al.

(10) Patent No.: US 6,567,038 B1
(45) Date of Patent: May 20, 2003

(54) TRACKING SYSTEM FOR SPORTS

(75) Inventors: Yair Granot, Modiin (IL); Michael Tamir, Tel-Aviv (IL); Avi Sharir, Ramar Hasharon (IL)

(73) Assignee: Orad Hi-Tec Systems, Ltd., Kfar Saba (IL)

( * ) Notice: Subject to any disclaimer, the term of this patent is extended or adjusted under 35 U.S.C. 154(b) by 0 days.

(21) Appl. No.: 09/647,827

(22) PCT Filed: Apr. 9, 1999

(86) PCT No.: PCT/GB99/01112

§ 371 (c)(1),
(2), (4) Date: May 3, 2001

(87) PCT Pub. No.: WO99/53339

PCT Pub. Date: Oct. 21, 1999

(30) Foreign Application Priority Data

Apr. 9, 1998 (GB) .............................................. 9807540

(51) Int. Cl.⁷ .......................... G01S 13/78; G01S 13/75; G01S 13/87

(52) U.S. Cl. .............................. 342/44; 342/42; 342/43; 342/195; 342/450; 342/451; 342/453; 342/458; 342/463; 342/465

(58) Field of Search ..................... 342/42–51, 450–465, 342/27, 28, 175, 195

(56) References Cited

U.S. PATENT DOCUMENTS 4,107,675 A * 8/1978 Sellers et al. .................. 342/42
4,551,725 A * 11/1985 Schaffer ....................... 342/44

FOREIGN PATENT DOCUMENTS

| FR | 2679146 | 1/1993 |
| FR | 2711069 | 4/1995 |
| GB | 2 298098 | 8/1996 |

* cited by examiner

*Primary Examiner*—Bernarr E. Gregory
(74) *Attorney, Agent, or Firm*—Fish & Richardson P.C.

(57) ABSTRACT

A cooperative tracking system designed to track multiple cooperative targets within a given field in real time with high precision and high update rate comprises a microwave transmitter and two receivers with each target being provided with one or more coded microwave transponders which enable calculation of both position, speed and in a preferred embodiment direction of movement of each target.

5 Claims, 5 Drawing Sheets

TRACKING SYSTEM FOR SPORTS

The present invention relates to a tracking system for sports and more particularly to a tracking system for a plurality of sports players positioned on a pitch or similar area. The system can also comprise tracking of other objects such as horses on a track or racing cars, sailing boats, etc.

The present invention is to be marketed under the name SporTrack is a tracking system that measures the location of players and other objects on the field, with high accuracy and video update rates. The system of the present invention is able to track 100 players or more, simultaneously, in real-time for long periods of time.

The system of the present invention is a cooperative tracking system, designed to track multiple cooperative targets within a given field in real-time with high precision and extremely high update rate. The system is based on state of the art microwave modules and advanced tracking algorithms, to achieve an accurate, independent player location, in every video frame. Synchronized to a calibrated video camera, the system gives the exact location of each player on the screen, allowing instant digital and virtual replay, many different statistics and more. Current microwave technology allows a low power, lightweight tracking system due to precise digital components such as direct digital synthesizer (DDS), high frequency A/D converters and DSPs. The system's operate at low power (much lower than any ordinary cellular phone) and carefully chosen operating frequencies, assures safe operation in any human or EMI environment and conforms with the strictest international and American standards.

The tracking system will track a player, within the designated field, who is wearing a miniature ID tag. This tag, which may be smaller than a credit card and lighter than 20 grams, is actually a transponder that reflects the signal sent from the transmitter and identifies each player in his exact location. This procedure is done simultaneously for all players, and is preferably repeated every video frame. The tracking of each player is independent, and a single player can be tracked as well as 50 players, all on the same field.

BRIEF DESCRIPTION OF THE INVENTION

SporTrack utilizes some of the latest microwave and DSP technologies. The main building block is an advanced, low power, spread spectrum radar that incorporates the advantages of MMIC (Miniature Microwave Integrated Circuits) components and power signal processors.

The use of these microwave components allows the system not only to be small and lightweight, but also inexpensive. Due to the fact that the system is designed to operate at short distances, and the use of spread spectrum techniques, the average and peak transmitting power is so low, that it is literally unaffected by EMI/RFI and completely safe to humans. In fact, the carefully chosen transmitting frequencies and output power are well below any international radiation standards including the strictest FCC recommendations in the USA. The small transponders worn by the player are similar to the "smart cards" that are developed today around the world for many different applications. The transponders small volume and weight make it almost unnoticeable to the player that can keep playing exactly as before.

The high update rate and the use of advanced waveforms being the need to process large amounts of data in a very short time. This is the reason that the main processor was developed with the Analogue Device SHARC processor, a powerful DSP which is widely used all over the world. The processor handles long FFTs and IFFTs as well as tailor made CFAR (Constant False Alarm Rate) algorithms. The processor and these high rate algorithms are developed together to achieve the high efficiency needed for real-time operation. Other, more situation dependent algorithms, such as the various stages of the tracking procedure are processed in another DSP, which is also a part of the main processor.

Much attention is given to the integration of the tracking system with the video cameras and the graphics computer. Successful integration means a synchronized system, enabling instant transformation from field coordinates to pixel location in every single frame.

TV broadcasts of sports events use different graphic effects such as highlighting a player, marking his trail, measuring his position, and more. In order to display the graphics on the screen in real-time, or instant replay, the object's position must be known. Current methods of tracking allow image tracking but have the disadvantage of working off-line and most methods lack robustness. Thus, it takes a long time to track a player from a video clip, and the user must supervise the process. This prevents instant replays with graphic effects, of interesting plays in a live broadcast.

GB A 2298098 discloses a tracking system for tracking objects in an area comprising first and second microwave antennas, one antenna comprising a microwave transmitter and one a receiver and including coded transponders carried by one or more of the objects to be tracked in the area the receiver receiving and processing coded signals for calculating the position and identity of each object.

FR A 2711069 discloses a system for tracking players on a sports field using a plurality of radio transponders.

It is an object of the present invention to provide a system that will track the objects automatically with high precision and in real-time.

The present invention therefore provides a tracking system for tracking players or objects on a sports field, said system comprising a first and a second microwave antenna, one antenna comprising a microwave transmitter and a receiver and the other only a receiver and including one or more coded transponders respectively carried by one or more players or objects on said field, electronic receivers comprising electron processing circuitry connected to receive signals from said transponders received at both said first and second antennas to calculate the position and identity of each player on said field, characterised in that each transponder is unique and comprises means for receiving a microwave signal at a defined frequency from an antenna, means for shifting the frequency of said received signal by a unique frequency and means for transmitting said shifted frequency signal back to the antenna.

Preferably in the processing circuitry of each receiver means are provided for sorting incoming frequency signals according to their various shifts and also for determining the range of each shifted signal according to the time difference between a transmitted signal and each shifted received signal.

Preferably each player is provided with a pair of transponders of different frequency shift and the receiver circuitry comprises means for recording the frequency shift identity of both of the transponders for each player and further comprises means for decoding the output of each pair of transponders to provide the direction of movement of a player.

BRIEF DESCRIPTION OF THE DRAWINGS

The present invention will now be described, by way of example, with reference to the accompanying drawings in which.

DETAILED DESCRIPTION OF THE INVENTION

The system includes four major units:

MEU 16—the main electronic unit with most of the digital and RF components

Transmit/Receive unit 18, 20—the transmitter, receivers and their respective antennas Transponders—up to 100 transponders worn by the players O2 workstation—for running the different applications, such as Digital Replay, Virtual Replay, stagtistics display, and more.

Figure 1:
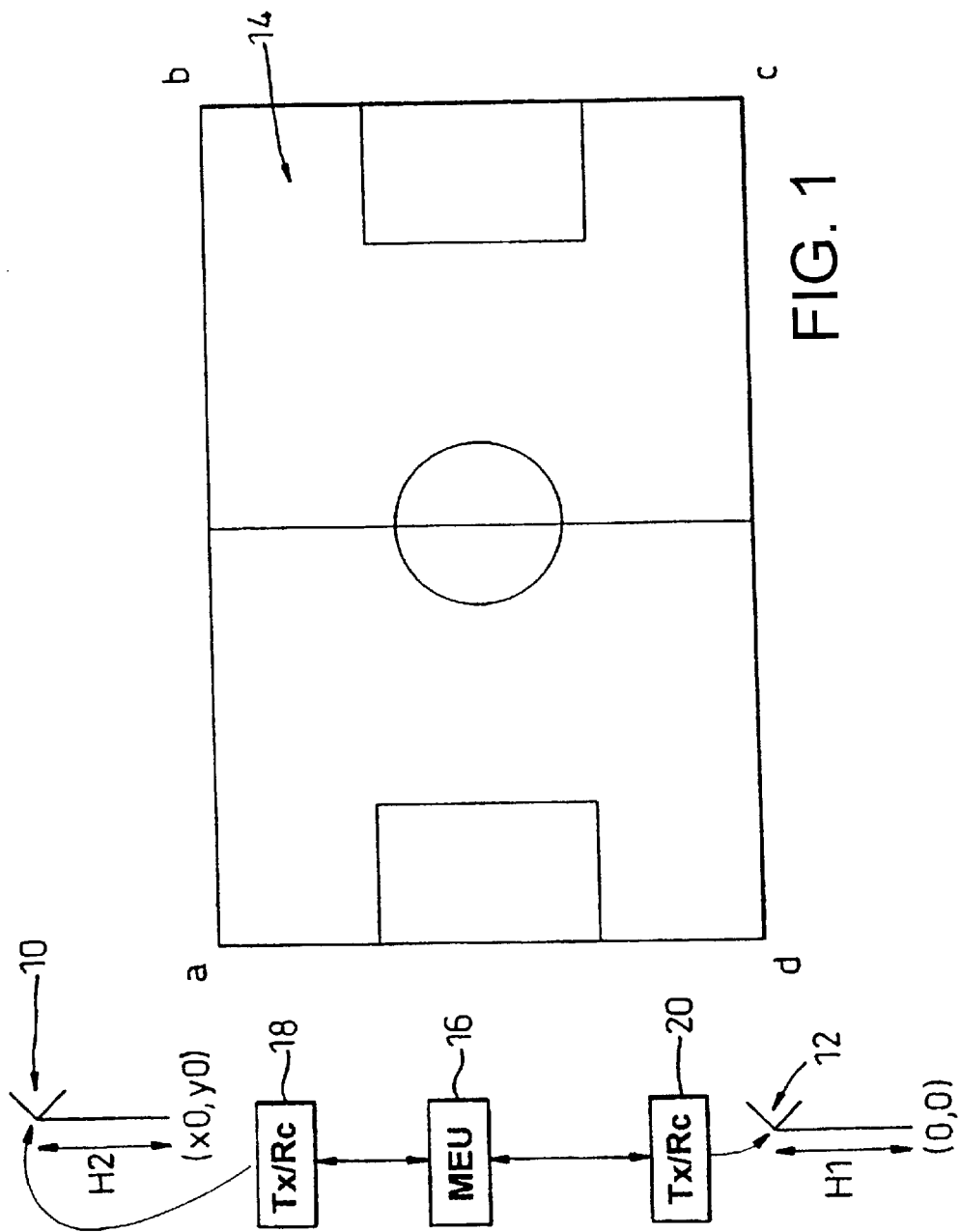
FIG. 1 shows diagramatically a plan view of a football pitch illustrating the position of antenna.
Figure 2:
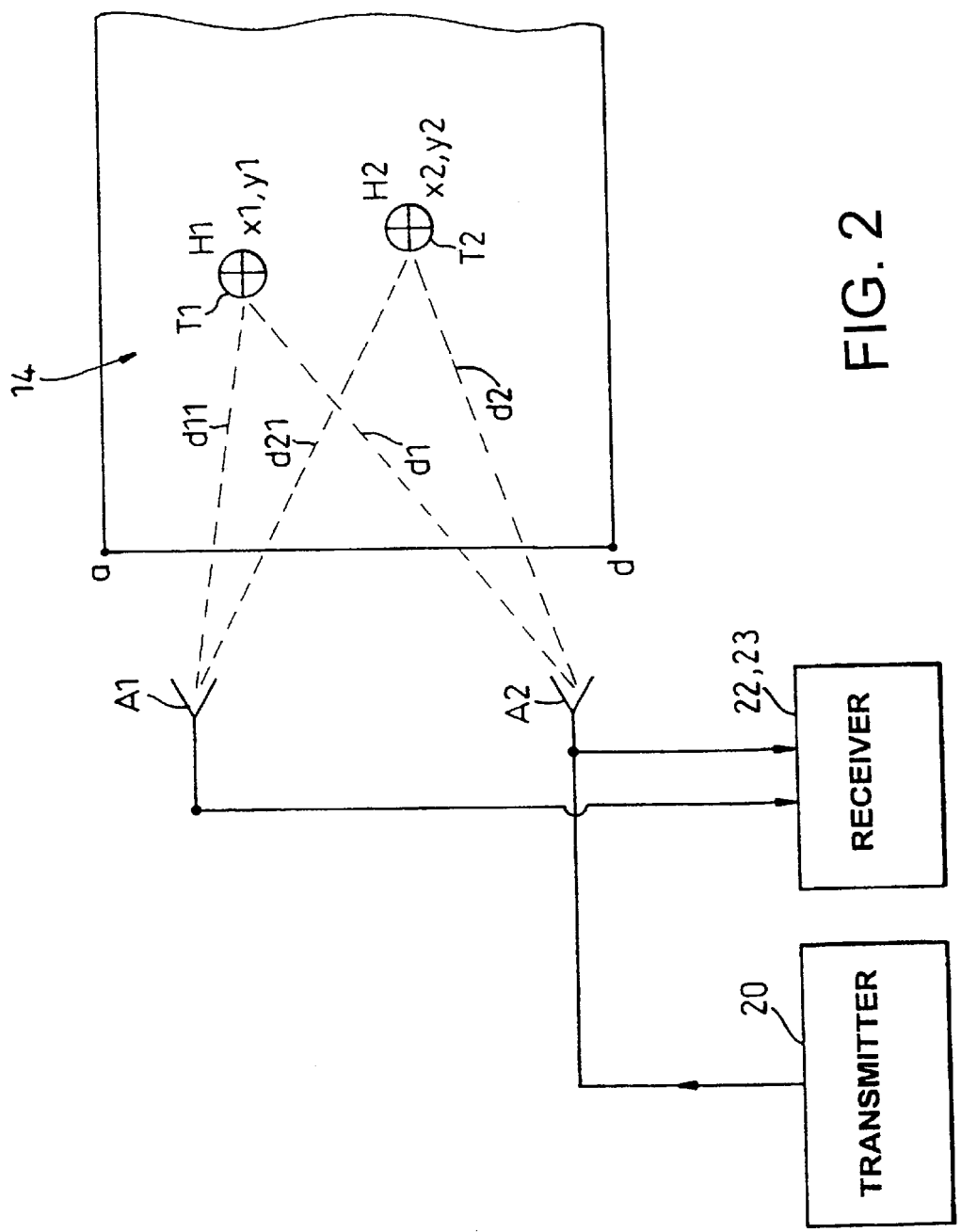
FIG. 2 shows diagramatically a portion of the pitch of FIG. 1 illustrating the position of two players H1 and H2.

The diagram as shown in FIGS. 1 and 2 show a typical installation with two antennas 10, 12 however usually 4 antennas are used for redundancy purposes.

The antennas 10, 12, which are very compact, can be installed in various places, according to the stadium as long as they are preferably 10–20 meters high and preferably more than 20 meters from the closest end of the field. No line of sight is needed to each player, but there should be no major obstacles between the antennas and the field. After a short calibration process in which points a, b, c and d in the diagram are determined, the position of each player on the field will be reported relative to the field's center.

The MEU 16 is relatively compact (15×15×30 cm) and should be installed in the vicinity of the transmitting antenna. The MEU is connected to a standard 220V or 110V power supply, and supplies the power to all the other units.

The transponders T1, T2, which are very small and lightweight, are worn by the players, and need no special attention. Each transponder can preferably function for about 3 to 4 hours without replacing or recharging the battery.

SporTrack is based on advanced signal processing techniques utilizing Continuous Wave (CW) and spread spectrum waveforms. The transmitter sends a very high bandwidth signal, allowing high range resolution. The signal hits the transponders on the field, and is reflected back to the receivers. Each receiver measures the distance to all the transponders. The distance from a transponder to both receivers, which are installed in a known position, is used to calculate the location of the player on the field.

The identification of each player is accomplished through a predetermined frequency shift on the tag. Every tag receives the carrier frequency, transmitted from the antenna, shifts it by a unique frequency and sends the shifted signal back. In the receiver, the frequencies are sorted according to the different shifts, and every signal is used to determine the range. Thus, the ID is extracted from the frequency sorting and the range of the tag, from the time difference between the transmitted signal and the received one. Each player wears two tags that enable us to determine the player's heading, by calculating the difference in location between the two tags.

Using techniques lice high resolution, spread spectrum and advanced signal processing algorithms on one hand, and state of the art miniature microwave modules on the other, the system can operate with an extremely low power and high precision.

The returned signals are filtered with digital filters implemented on commercial off the shelf DSPs, which are the system's main signal processor. The players' positions are reported each frame and each player is tracked with a Kalman filter, which is optimal for these situations. The system is synchronized to the cameras in the field and so the exact position of each player is given for every frame, with the screen coordinates of the camera.

With reference to FIG. 2, in a preferred embodiment, antenna A1 and A2 overlook the field 14, only a portion of which is shown. Two players H1, H2 are shown, by way of example, at respective positions x1, y1 and x2, y2. Each player is equipped with a pair of transponders T1, T2 which are individual to each player. The identity of each transponder is recorded in the MEU 16 prior to each game.

One antenna is connected to transmit microwave signals from a transmitter 20 and backs two receivers 22 and 23.

Each player H1, H2 is at a respective distance d and d11 respectively from antenna A2 and A1 and d2, d21 from antenna A2 and A1. Therefore the respective flight times of the microwave signals to and from the trasponders T1, T2 represent the distances as d1, d11 and d2, d21.

Figure 3:
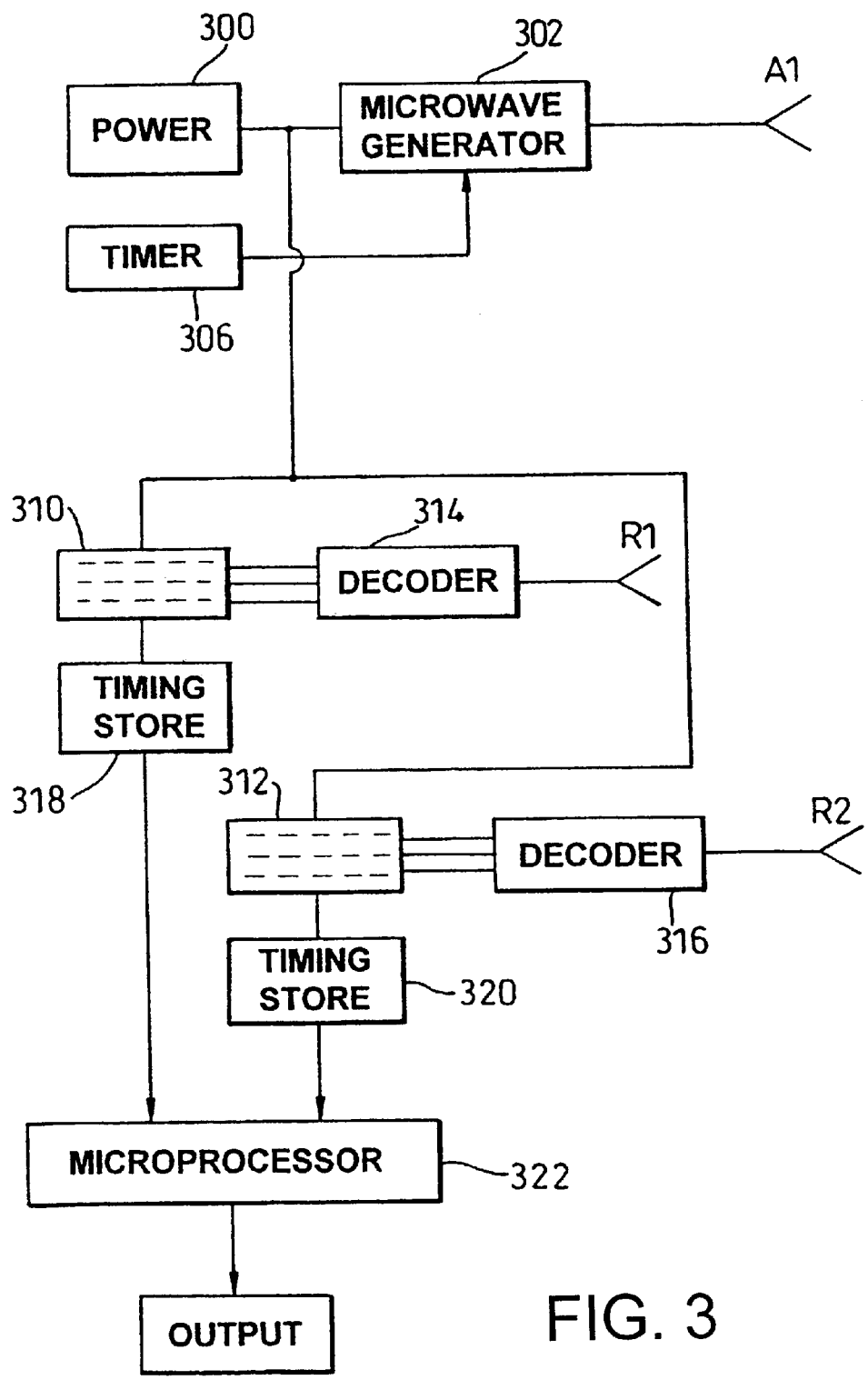
FIG. 3 shows a block diagram of the electronic circuitry.

In FIG. 3 a block diagram is shown in which, for simplicity, the receiver input is separated from the transmitter output.

Power is provided by unit 300 to a microwave generator 302. The outputs of the generator 302 is controlled by a timer 306. When two systems are installed together (the usual installation of 4 antennas) the microwave generator of each unit will operate at a different frequency to eliminate mutual disturbance.

The timer 306 is also connected to a first and second timer stores 310, 312.

Each receiver, possibly combined with the transmitters, R1 and R2 is connected to a respective decoder circuit 314, 316.

A second store 318, 320 stores the time differences calculated from the respective transmit and receive times and identified by the respective phase shifts.

These two differences are then used in a microprocessor 322 to calculate the x, y positions of each player.

Figure 4:
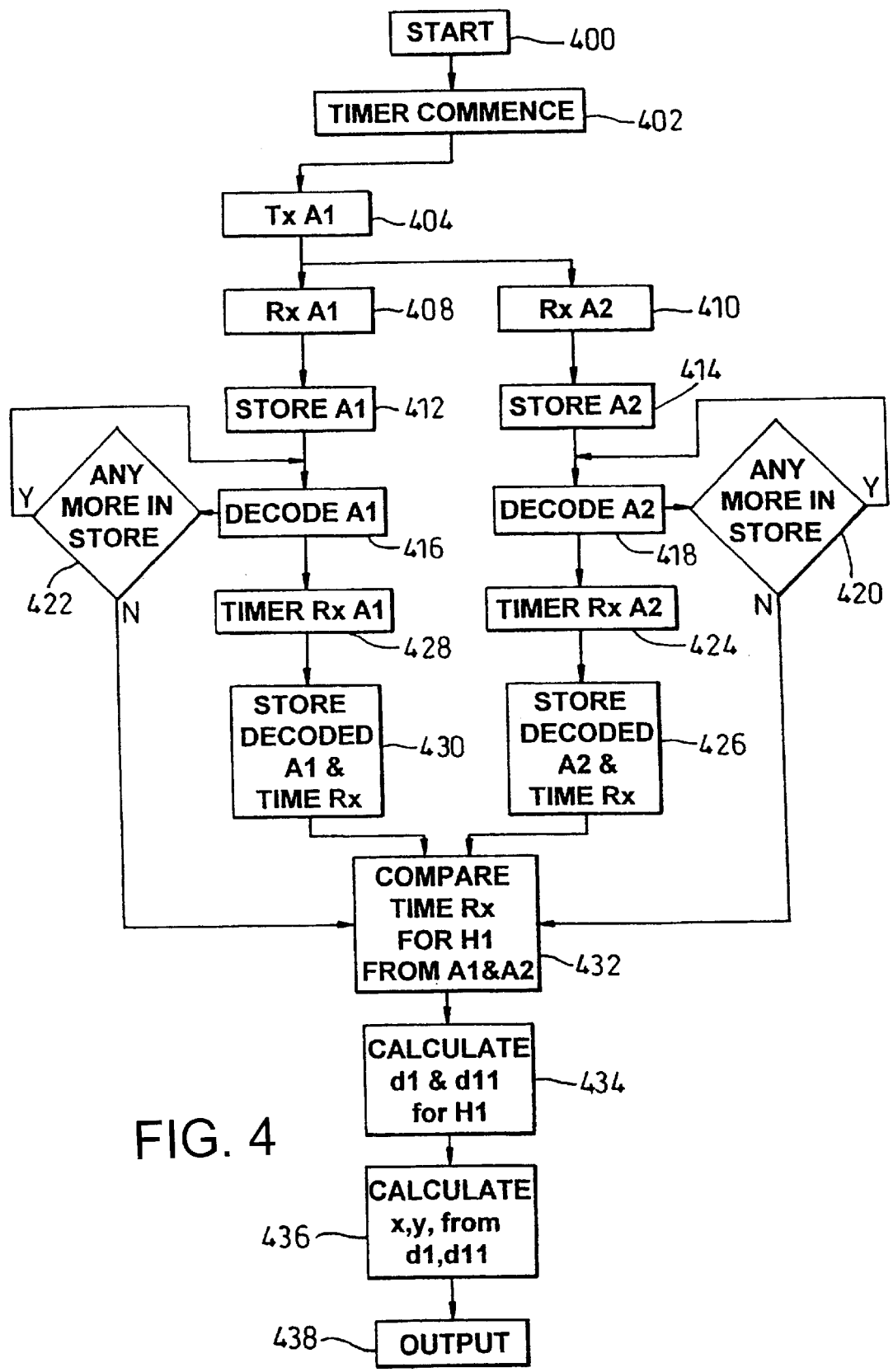
FIG. 4 shows a flow diagram suitable for generating the data for tracking a plurality of players.
Figure 5:
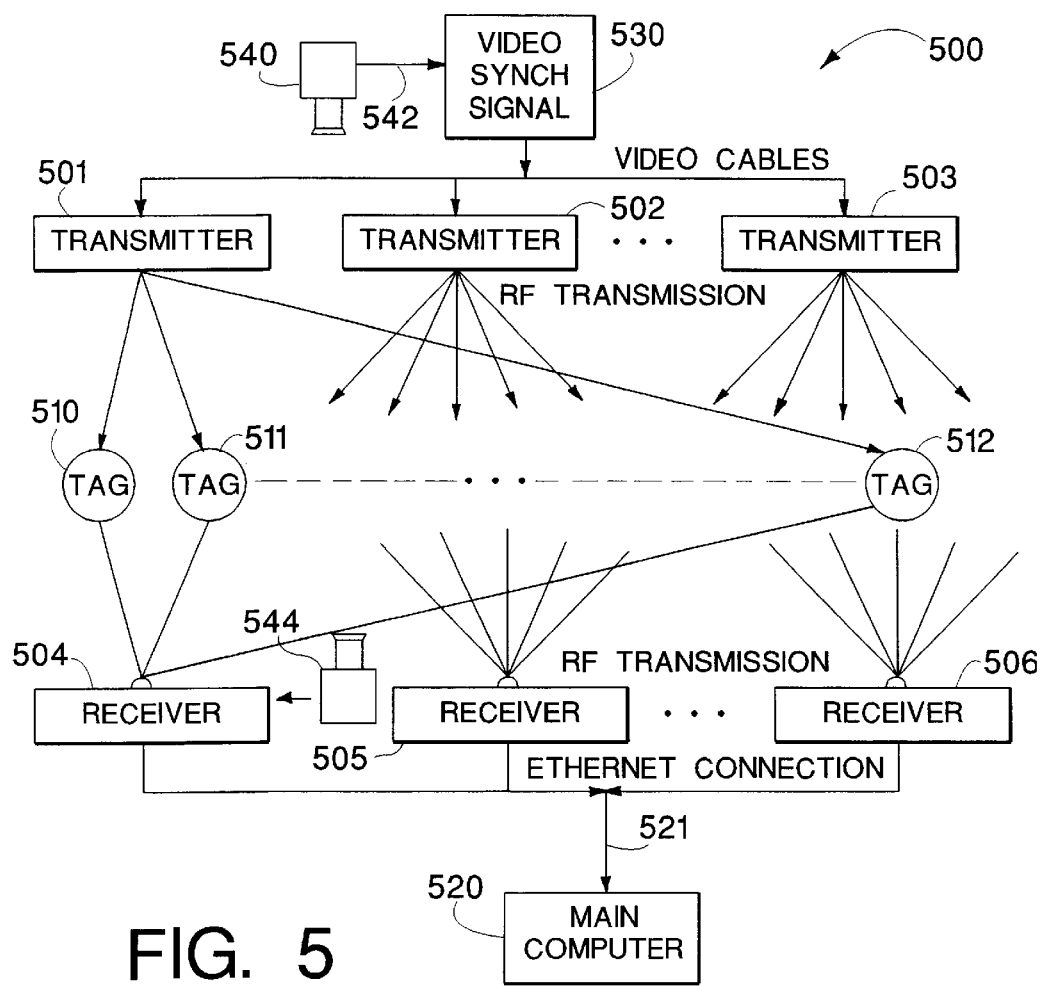
FIG. 5 shows a further example of the present invention illustrating the present invention applied to a horse racing track.

With reference now to FIG. 4, a flow diagram is shown.

The sequence commences 400 to start the time 402 which energises transmitter A1 to transmit pulses 404, 406.

Signals are then received 408, 410 at receivers R1, R2 and the output times of receipt stored in stores 412, 414 and decoded 416, 418.

The sequence of the time difference recordal is repeated 420, 422 until no further time sequence signals are left to thereby ensure signals from all players are recorded.

The times for each player are recorded in a store (step 424, 426 and 428, 430).

The recorded times are compared (step 432) once all have been recorded and the distances calculated (step 434).

Once no further calculations are necessary (step 436) the sequence may be recommenced.

From the distances (d1 etc) calculated in step 434, the x, y positions are calculated (step 436) and outputted (step 438) to be used either to transmit or for storage of the positions of each player.

A specific example will described ill detail one of SporTrack's applications, namely, the tracking of horses in a horse race.

System Components

The system 500 comprises the following components:
a) transmit/receive units 501,502,503,504,505,506 (transceivers)—each transmits from a video signal system generator 530 and receives a linear FM signal.

Every unit has its own separate (but not exclusive) band within the total band. Though these are shown separately, the transmitter and receiver are combined in one unit or are in adjacent units.

b) transponder units 510,511,512 (tags)—every tag receives signals within the frequency band, adds a unique frequency code by mixing the signal with the output of a local oscillator, and transmits the signals back.

c) main computer 520 receives the range information from all transceivers, calculates the location of each horse, saves it in a database, and displays the data by means of graphical representation for a TV broadcast.

d) broadcast camera 540 the measurement of location of the horses is synched to a broadcast camera, so that the data is accurate for every frame. The camera's synch signal 542 is used to synch the RF signals as well.

Each horse carries 2 tags 510 or more (on both sides of its saddlecloth) that marks its position and ID. Each tag 510, 511,512 is unique, in the sense of the frequency code that it transmits when a RF signal is received.

Installation

Every transmitter 501,502,503 and receiver 501,502,502 has its own antenna to make a total of 2 antennas per transceiver. These are installed around the racing track in such a way that each part of the track is covered by 2 transceivers or more. Each transmitting antenna 501 is installed next to its receiving antenna 504. As in the previous example, the antennas are installed above the track plane, and at some distance from the track, so that there is a view point that allows coverage of the track.

The transceivers are connected to a power source, a video synch signal and an Ethernet connection 521.

The main computer 520 is located in the pressroom and is also connected to the network of transceivers by means of Ethernet interface.

The transponders 510,511,512 are placed inside a small pocket in the inner part of the saddlecloth. Each saddlecloth has 2 pockets, one on each side, next to tile number designating its identity.

The transmitter frequencies could be in a specific example between 5.7 to 5.9 Giga hertz. The transponder frequency shift in this example could be between 1 to 2 Mhz.

System Operation

The system is synched to the video camera 540 so that every measurement made is related to a video frame. The signal is characterised by linear frequency modulation (LFM) starting from low frequency toward the high one (chirp up pulse) followed by a chirp down pulse starting from the high frequency to the low one. Each vertical synch from the camera 540 initiates a chirp up LFM pulse, followed by a chirp down pulse.

The signal covers a specific part of the racing track and is received by every tag 510 found inside this part at the time of transmission. Each tag that receives the signal, adds its own unique frequency code to it and transmits it back.

Each receiver receives 504 the signal and resolves it into elements, including the ID, range, Doppler and side. The side parameter is determined by a small difference in frequency between the left and right tags of each horse.

The ranges measured from each antenna are sent to the main computer using an Ethernet interface 521. All ranges from a horse to any transceiver that picked it up are used to calculate the position of that horse, by means of triangulation between two receivers.

Systems Applications

The tracking system output is given in the form of (x, y, id) triplets or (x, y, z, id) quadruplets. For each video frame the output data is processed in the main computer. The processed data is then used by different applications. Some of the main applications are:

a) automatic camera tracking of a particular horse—the position data of a predefined horse is fed into a motorized camera unit 544 which is able to move along with the horse to capture its movements wherever it may be around the track b) live highlighting of the leading horse—the leading horse is automatically identified and its image on the screen is highlighted in the live broadcast. The horse's name, number and name of the jockey riding it can also be displayed on the live video.

c) real time and archived database—the position of each horse is recorded and kept in a database that can be used to analyse different statistics in a race. A few examples are sectional timing, average speed and speed distribution during the race, maximum speed, acceleration, etc. The database also includes other criteria such as track type and condition to allow automatic comparison of horses' performance according to environmental and other conditions.

What is claimed is:

1. A tracking system for tracking players or objects on a sports field, said system comprising a first and a second microwave antenna, one said antenna comprising a microwave transmitter and a receiver and the other said antenna comprising only a receiver, one or more transponders respectively carried by one or more of the players or objects on said field, each said receiver comprising electronic processing circuitry connected to receive signals from said transponders received at both said first and second antennas to calculate the position of and to identify each of the players or objects on said field, and each of the transponders comprising means for receiving a microwave signal at a defined frequency from said one antenna, means for shifting the frequency of said received microwave signal by a frequency unique to said transponder relative to other ones of said transponders in said tracking system, and means for transmitting said shifted frequency signal for reception by said first or said second antenna.

2. A tracking system as claimed in claim 1 in which the processing circuitry of each said receiver is provided for sorting incoming frequency signals according to their various shifts and also for determining the range of each shifted signal according to the time difference between a transmitted signal and each shifted received signal.

3. A tracking system as claimed in claim 1 or claim 2 in which each player is provided with a pair of transponders of different frequency shift and the receiver circuitry comprises means for recording the frequency shift identity of both of the transponders for each player and further comprises means for decoding the output of each pair of transponders to provide the direction of movement of a player.

4. A tracking system as claimed in claim 3 in which each player comprises a horse and in which a first transponder is situated on one side of the horse and a second transponder is situated on the other side of the horse, the signal from both of said transducers being resolvable into elements including the ID, range, Doppler and side identification.

5. A tracking system as claimed in claim 4 in which said signals are supplied to a moveable camera which is able to track the movement of a specific horse.

* * * * *